United States Patent
Matsutani et al.

(10) Patent No.: US 11,919,408 B2
(45) Date of Patent: Mar. 5, 2024

(54) APPARATUS, METHOD, AND SYSTEM FOR PROVIDING ELECTRICITY TO A VEHICLE PROVIDING A SERVICE

(71) Applicant: Toyota Jidosha Kabushiki Kaisha, Toyota (JP)

(72) Inventors: Shintaro Matsutani, Kariya (JP); Aya Sato, Miyoshi (JP); Yasuki Nakagawa, Toyota (JP); Shigeru Inamori, Nagoya (JP); Fuminori Matsuoka, Toyota (JP); Taro Hasegawa, Toyota (JP); Masaki Nanahara, Toyota (JP); Misaki Sato, Nisshin (JP); Motoki Maekawa, Nagakute (JP); Hiroki Ashizawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 492 days.

(21) Appl. No.: 16/951,322

(22) Filed: Nov. 18, 2020

(65) Prior Publication Data

US 2021/0146795 A1 May 20, 2021

(30) Foreign Application Priority Data

Nov. 20, 2019 (JP) .................................. 2019-209430

(51) Int. Cl.
  *B60L 53/126* (2019.01)
  *B60L 58/12* (2019.01)
  *B60L 58/18* (2019.01)

(52) U.S. Cl.
  CPC ............. *B60L 53/126* (2019.02); *B60L 58/12* (2019.02); *B60L 58/18* (2019.02)

(58) Field of Classification Search
  CPC ........ B60L 53/126; B60L 58/12; B60L 58/18; B60L 53/57; B60L 53/80; B60L 2200/30; B60L 2200/40; B60L 53/68; G08G 1/166; Y02T 90/167; Y02T 10/70; Y02T 10/7072; Y02T 90/12; Y02T 90/14; Y02T 90/16; Y04S 30/12; B60R 16/03; B60W 50/00; B60W 60/00
  See application file for complete search history.

(56) References Cited

U.S. PATENT DOCUMENTS 9,527,394 B1 * 12/2016 Tang ..................... B60W 10/26
9,940,840 B1 *  4/2018 Schubert ............ G01C 21/3407
(Continued)

FOREIGN PATENT DOCUMENTS

CN    110414728 A   11/2019
JP    2016025712 A   2/2016
(Continued)

*Primary Examiner* — Sze-Hon Kong
(74) *Attorney, Agent, or Firm* — Dinsmore & Shohl LLP

(57) ABSTRACT

An information processing apparatus controls a vehicle having a service power supply used to provide a service and a driving power supply used for traveling. The information processing apparatus has a storage unit configured to store service-related information concerning the service provided by the vehicle, and a controller configured to select any of a first mode, in which the service power supply and the driving power supply are independently used, and a second mode, in which the service power supply and the driving power supply are shared, based on the service-related information.

20 Claims, 12 Drawing Sheets

(56) References Cited

U.S. PATENT DOCUMENTS

| | | | |
|---|---|---|---|
| 10,840,735 B1* | 11/2020 | Cooper | H02J 3/32 |
| 11,233,397 B2* | 1/2022 | Abu Qahouq | H02J 3/381 |
| 2011/0025267 A1* | 2/2011 | Kamen | B60L 53/00 |
| | | | 320/109 |
| 2011/0215641 A1* | 9/2011 | Peterson | H02J 4/00 |
| | | | 307/23 |
| 2012/0255279 A1* | 10/2012 | Atluri | F01N 3/027 |
| | | | 60/299 |
| 2015/0081127 A1* | 3/2015 | Bhageria | H02J 4/00 |
| | | | 700/295 |
| 2016/0006275 A1* | 1/2016 | Lee | G01R 31/382 |
| | | | 320/112 |
| 2018/0012198 A1* | 1/2018 | Ricci | G06Q 30/0206 |
| 2018/0056902 A1* | 3/2018 | Trinkner | H02J 7/00 |
| 2018/0314263 A1 | 11/2018 | Aiuchi et al. | |
| 2020/0001720 A1* | 1/2020 | Pighi | B60L 50/10 |
| 2020/0164763 A1* | 5/2020 | Holme | B60L 58/10 |
| 2020/0381923 A1* | 12/2020 | Chow | H01M 10/4207 |
| 2021/0094441 A1* | 4/2021 | Sampson | B60K 1/02 |
| 2021/0152105 A1* | 5/2021 | Froelich | B60K 17/34 |
| 2021/0234391 A1* | 7/2021 | Kristjansson | G06F 1/1616 |
| 2022/0131398 A1* | 4/2022 | Herranz | H02J 7/00032 |

FOREIGN PATENT DOCUMENTS

| | | | |
|---|---|---|---|
| JP | 2018189373 A | | 11/2018 |
| JP | 2019-075047 A | | 5/2019 |
| WO | 2017/173420 A1 | | 10/2017 |

* cited by examiner

SERVICE-RELATED DATA

| SERVICE | UNIT | REQUIRED AMOUNT OF POWER |
|---|---|---|
| SALES OF COMMODITIES | UNIT FOR SALES OF COMMODITIES | 300Wh |
| SALES OF FOOD AND DRINK | UNIT FOR PROVISION OF FOOD AND DRINK | 1200Wh |
| SALES OF FOOD AND DRINK (INCLUDING COOKING) | COOKING UNIT | 1800Wh |
| RESTAURANT | SEATING UNIT + COOKING UNIT | 2500Wh |
| ROOM-TEMPERATURE FREIGHT TRANSPORTATION | ROOM-TEMPERATURE TRANSPORTATION UNIT | 30Wh |
| REFRIGERATED FREIGHT TRANSPORTATION | REFRIGERATED TRANSPORTATION UNIT | 800Wh |
| DELIVERY OF PARCEL LOCKER | PARCEL LOCKER UNIT | 300Wh |
| ... | ... | ... |

FIG. 4

CHASSIS INFORMATION

| CHASSIS ID | DATE | POSITIONAL INFORMATION | OPERATIONAL STATE | BATTERY INFORMATION |
|---|---|---|---|---|
| V001 | 2019/10/1 | BASE A | STANDBY | 12kWh |
| V002 | 2019/10/1 | (LATITUDE, LONGITUDE) | IN OPERATION | 18kWh |
| V003 | 2019/10/1 | (LATITUDE, LONGITUDE) | IN OPERATION | 24kWh |
| V004 | 2019/10/1 | BASE B | STANDBY | 20kWh |
| ... | ... | ... | ... | ... |

FIG. 5A

BODY INFORMATION

| BODY ID | ATTRIBUTE | DATE | POSITIONAL INFORMATION | OPERATIONAL STATE | BATTERY INFORMATION |
|---|---|---|---|---|---|
| B001 | SHOW ROOM | 12:00:00 | NO INFORMATION | IN OPERATION | 1kWh |
| B002 | REGISTER | 12:00:00 | NO INFORMATION | IN OPERATION | 1kWh |
| B003 | ROOM-TEMPERATURE SALES | 12:00:00 | BASE A | STANDBY | 500Wh |
| B004 | ROOM-TEMPERATURE TRANSPORTATION | 12:00:00 | NO INFORMATION | IN OPERATION | 500Wh |
| ... | ... | ... | ... | ... | ... |

FIG. 5B

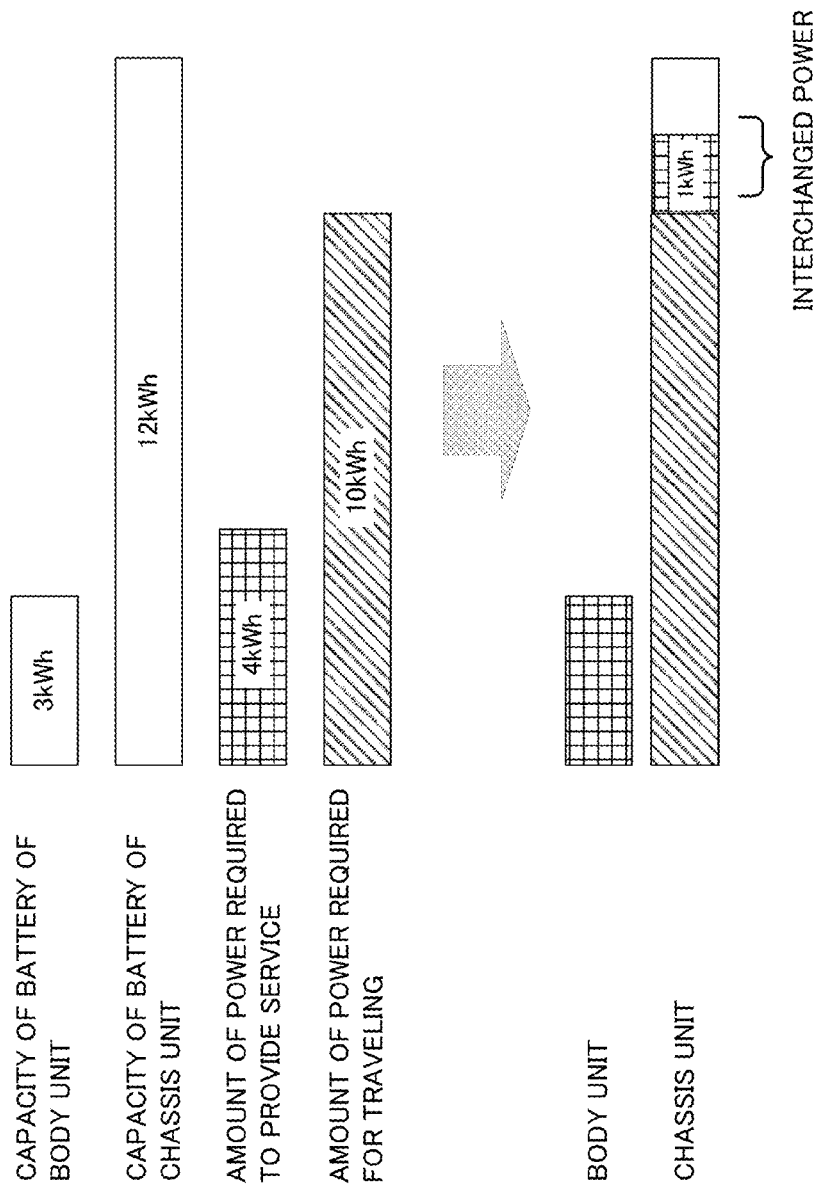

APPARATUS, METHOD, AND SYSTEM FOR PROVIDING ELECTRICITY TO A VEHICLE PROVIDING A SERVICE

CROSS REFERENCE TO RELATED APPLICATION

This application claims priority to Japanese Patent Application No. 2019-209430, filed on Nov. 20, 2019, incorporated herein by reference in its entirety.

BACKGROUND

Technical Field

The present disclosure relates to a technique of providing a service by vehicle.

Description of the Related Art

Attempts have been made to provide services by sending automatic driving cars designed for various purposes. For example, Patent document 1 discloses an apparatus that determines a vehicle to be sent based on the demand for a service and the availability of vehicles and indicates the vehicle to move.

The vehicle is formed by a combination of a vehicle platform (chassis) and a cabin module (cabin), and the cabin can be changed to meet various demands.

CITATION LIST

Patent document 1: Japanese Patent Laid-Open No. 2019-075047

SUMMARY

In order to provide a service by vehicle, electricity is constantly needed. However, no attempt has been made to appropriately allocate electricity between making the vehicle move and providing a service.

The present disclosure has been devised in view of the problem described above, and an object of the present disclosure is to provide a vehicle capable of appropriately supplying electricity.

A first aspect of the present disclosure is an information processing apparatus that controls a vehicle having a service power supply used to provide a service and a driving power supply used for traveling.

Specifically, the information processing apparatus has a storage unit configured to store service-related information concerning the service provided by the vehicle, and a controller configured to select any of a first mode, in which the service power supply and the driving power supply are independently used, and a second mode, in which the service power supply and the driving power supply are shared, based on the service-related information.

A second aspect of the present disclosure is an information processing method performed by the information processing apparatus.

Specifically, the information processing method includes an acquisition step of acquiring service-related information concerning the service provided by the vehicle, and a control step of selecting any of a first mode, in which the service power supply and the driving power supply are independently used, and a second mode, in which the service power supply and the driving power supply are shared, based on the service-related information.

Another aspect of the present disclosure may be a program that makes a computer perform the information processing method described above, or a computer-readable memory medium that non-temporarily stores the program.

Another aspect of the present disclosure may be a vehicle system including the information processing apparatus described above and a second information processing apparatus that provides service-related information.

According to the present disclosure, a vehicle capable of appropriately supplying electricity can be provided.

BRIEF DESCRIPTION OF THE DRAWINGS

FIG. 4 illustrates an example of service-related data stored in the server apparatus.

FIG. 5A illustrates an example of chassis data stored in the server apparatus.

FIG. 5B illustrates an example of body data stored in the server apparatus.

FIG. 6A is a diagram illustrating a power interchange between units.

DESCRIPTION OF THE EMBODIMENTS

Figure 1:
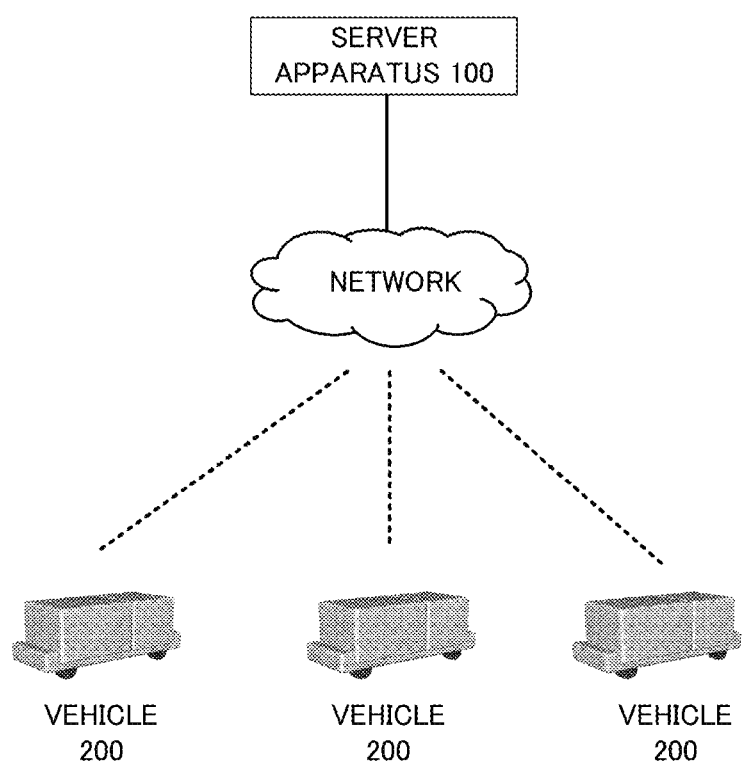
FIG. 1 is a diagram illustrating a general configuration of a vehicle system according to a first embodiment.

An information processing apparatus according to an embodiment is an apparatus that controls a vehicle having a service power supply used to provide a service and a driving power supply used for traveling.

The service power supply is a power supply for the vehicle to provide a predetermined service. The service provided by the vehicle is retail, provision of food and drink, transportation of people or transportation of freight, for example. However, the service may be other services. The driving power supply is a power supply used to produce a motive power that allows the vehicle to travel.

The vehicle according to the embodiment may be a vehicle including a vehicle platform and a cabin that can be separated from each other.

The vehicle platform is a mobile body provided with a plurality of wheels and a power source. The vehicle platform has only to be able to travel and does not have to have a cabin. The vehicle platform may be configured so that a plurality of units having different capabilities can be loaded thereon. By loading a predetermined unit on the vehicle platform, a vehicle used for a predetermined application can be assembled. By replacing a loaded unit with another unit, the application of the vehicle can be changed.

Units that can be loaded on the vehicle platform include a unit having a cabin space, a unit on which a package is loaded, a unit having sales equipment, and a unit having cooking equipment. However, other units are also possible. In the following, a unit loaded on the vehicle platform will be referred to as a body unit.

When the vehicle is composed of the vehicle platform and the body unit, the vehicle platform may have the driving power supply, and the body unit may have the service power supply.

If the driving power supply and the service power supply are separated from each other, a problem arises that the driving power supply and the service power supply cannot interchange power. For example, the vehicle may be unable to travel because of the lack of the power of the driving power supply even though the there is a remaining power in the service power supply, or the vehicle may be unable to continue providing the service because of the lack of the power of the service power supply even though there is a remaining power in the driving power supply.

To solve the problem, the information processing apparatus used in the embodiment has a storage unit configured to store service-related information concerning the service provided by the vehicle, and a control part configured to select any of a first mode, in which the service power supply and the driving power supply are independently used, and a second mode, in which the service power supply and the driving power supply are shared, based on the service-related information.

The information processing apparatus may be a server apparatus connected to the vehicle over a network or an on-board apparatus that controls the vehicle.

The service-related information is information on the service provided by the vehicle.

The service-related information may be data that associates the service provided by the vehicle and an amount of power required to provide the service with each other.

The storage unit stores information on what service is provided by the vehicle or how much power is required to provide the service, for example. The control part determines whether the two power supplies need to interchange power or not and selects an appropriate mode based on the service-related information.

With such a configuration, the service provided by the vehicle can be expanded.

The control part may select the second mode when an amount of power provided by the service power supply alone is insufficient to provide the service or when an amount of power provided by the driving power supply alone is insufficient for the vehicle to travel along a predetermined travel route.

The mode can be determined before the vehicle starts operating. However, the mode can also be changed during operation, depending on the circumstance. For example, after the vehicle starts operating in the first mode, the mode can be switched to the second mode if an unexpected power consumption occurs and it becomes difficult for the vehicle to continue operating (traveling or providing a service).

The storage unit may further store route information indicating the predetermined travel route, and the control part may determine whether the amount of power provided by the driving power supply is sufficient or not based on the route information.

Whether the power of the driving power supply is insufficient or not can be determined based on the route information. The route information may include a travel route along which the vehicle having completed the operation returns to an operation base (a base where the vehicle can be recharged), for example.

In the second mode, the control part may calculate an amount of power required for traveling and determine to use the driving power supply to provide the service within an upper limit of an excess amount of power of the driving power supply.

In the second mode, the control part may calculate the amount of power required to provide the service based on the service-related information, and determine to use the service power supply to drive the vehicle within an upper limit of an excess amount of power of the service power supply.

The excess amount of power can be determined by subtracting the amount of power required for traveling from the remaining power of the driving power supply. Alternatively, the excess amount of power can be determined by subtracting the amount of power required to provide the service from the remaining power of the service power supply.

The vehicle may be configured so that two or more units having different functions can be loaded, and each of the units may have the service power supply.

The control part may sum capacities of service power supplies of a plurality of units loaded.

In the following, embodiments of the present disclosure will be described with reference to the drawings. The configurations of the embodiments described below are given for illustrative purposes, and the present disclosure is not limited to the configurations of the embodiments.

First Embodiment

FIG. 1 is a diagram illustrating a configuration of a vehicle system according to a first embodiment. The vehicle system according to this embodiment includes a server apparatus 100 and one or more vehicles 200.

The vehicle 200 is an automatic driving vehicle with a chassis part and a body part that can be separated from each other. In the following, the chassis part will be referred to as a chassis unit, and the body part will be referred to as a body unit. The chassis unit is configured so that a plurality of body units having different functions can be loaded thereon. In the following, the term "body unit" will be used to generically refer to a plurality of body units having different functions.

At a base where the vehicle 200 is assembled, the body unit can be changed. Assembling a vehicle means loading one or more body units on a particular chassis unit to form a vehicle 200 used for a predetermined application. The vehicle can be assembled by conveying and loading a plurality of body units prepared in advance on an intended chassis unit. The assembly of the vehicle can be performed by a service provider, for example.

By changing body units, the vehicle 200 can provide various services. For example, if a body unit having a function as a show room is loaded, the vehicle can serve as a shop. Alternatively, if a body unit capable of cooking food and drink is loaded, the vehicle can serve as a restaurant. Since the vehicle can autonomously travel, the vehicle can move to a predetermined location (referred to as a site of business hereinafter) and provide a service.

The server apparatus 100 is an apparatus that controls the assembled vehicle 200. Specifically, the server apparatus 100 generates a command to make the vehicle 200 travel along a predetermined route and provide a service at the destination (referred to as an operation command hereinafter) and transmits the command to the vehicle 200.

The server apparatus 100 and the vehicle 200 are interconnected over a network. The network may be a wide area network (WAN) that is a global public communication network, such as the Internet, or other communication networks. The network may include a telephone network for cellular phones or the like or a wireless communication network, such as Wi-Fi (registered trademark).

Next, the vehicle 200 will be described in more detail.

Figure 2:
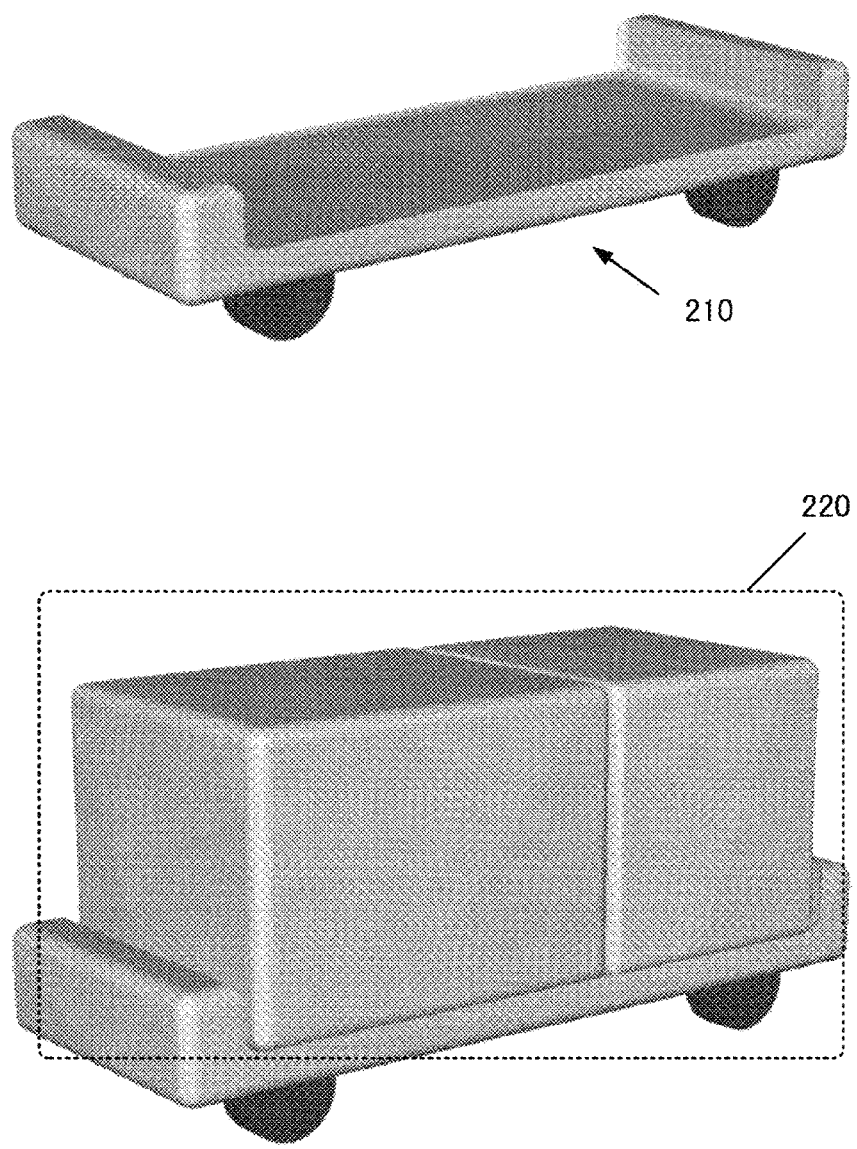
FIG. 2 is a view illustrating an appearance of a vehicle according to the first embodiment.

FIG. 2 is a view showing an appearance of the vehicle 200. The vehicle 200 according to this embodiment includes a chassis unit 210 and a body unit 220.

The chassis unit 210 is an automatic driving car that autonomously travels. The chassis unit 210 includes a wheel, a prime mover or electric motor, an apparatus that controls the traveling, and an automatic driving apparatus, for example, and travels according to a command transmitted from an apparatus that manages the operation of the vehicle 200. The chassis unit 210 can move with one or more body units 220 coupled thereto but can travel alone. The chassis unit 210 has a capability of communicating with the server apparatus 100. This capability allows the chassis unit 210 to transmit information on the current position or state of the chassis unit 210 to the server apparatus 100.

Although the chassis unit 210 is an autonomous traveling vehicle in this embodiment, the chassis unit 210 may be a vehicle operated by a driver or a semi-autonomous traveling vehicle that travels under the supervision of a driver.

The chassis unit 210 has a driving power supply (battery).

The body unit 220 is a unit loaded on the chassis unit 210 for use. In this embodiment, a plurality of units having predetermined functions is illustrated as the body unit 220. For example, the body unit 220 may be a unit used as a cabin (or an office room, a bed room or the like), a unit used as a sales space in a retail business, a unit used as seating room (or a cooking room) in a restaurant business, or a unit for freight transportation. However, the body unit 220 can also be other units. The body unit 220 can not only bear people or freight but also can provide a resource. For example, the body unit 220 may be a unit that supplies electricity, a refrigerator or freezer unit, a water supply or drain unit, or a sewage treatment unit. A vehicle 200 that provides a predetermined service can be assembled by loading a plurality of body units 220 in combination on the chassis unit 210.

The body unit 220 has a service power supply (battery).

Although the body unit 220 has been described as being loaded on the chassis unit 210 in the above example, the body unit 220 does not always have to be loaded on the chassis unit 210 as far as the chassis unit 210 and the body unit 220 can be coupled to each other in a predetermined manner.

The method of coupling the chassis unit 210 and the body unit 220 to each other is not limited to any particular method. For example, the chassis unit 210 and the body unit 220 may be mechanically coupled and separated with a lock mechanism or may be coupled and separated with an electromagnet or the like.

The method of loading the body unit 220 on the chassis unit 210 or unloading the body unit 220 from the chassis unit 210 may be a method of using a dedicated elevator or a method of using an accessory mechanism of the chassis unit 210 or body unit 220, for example. With the vehicle 200, the method of loading the body unit 220 on the chassis unit 210 or unloading the body unit 220 from the chassis unit 210 is not limited to any particular method.

Next, the server apparatus 100 will be described in detail.

Figure 3:
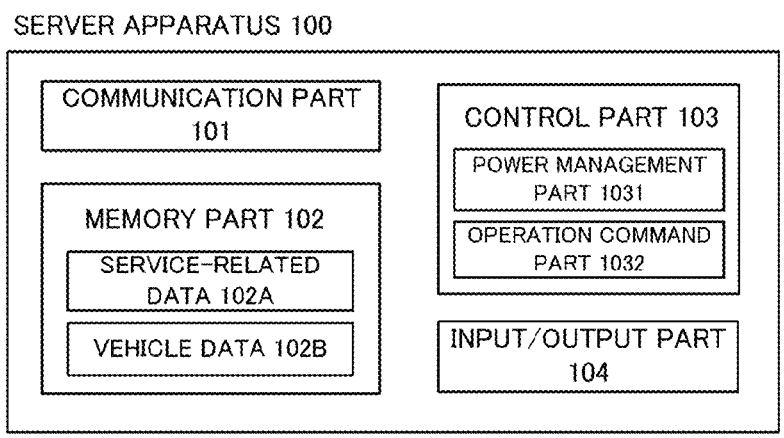
FIG. 3 is a diagram illustrating a system configuration of a server apparatus.

FIG. 3 is a diagram illustrating a system configuration of the server apparatus 100. The server apparatus 100 includes a communication part 101, a memory part 102, a control part 103 and an input/output part 104.

The server apparatus 100 is constituted by a common computer. Specifically, the server apparatus 100 is a computer having a processor, such as a CPU or GPU, a main memory, such as a RAM or a ROM, and an auxiliary memory, such as an EPROM, a hard disk drive or a removable medium. The removable medium may be an USB memory or a disk recording medium, such as a CD or a DVD. The auxiliary memory stores an operating system (OS), various programs, or various tables, and each of the various functions described later suitable for a predetermined purpose can be implemented by loading a program stored in the auxiliary memory into a working area of the main memory and executing the program to control each component or the like. However, some or all of the functions may be implemented by a hardware circuit, such as ASIC or FPGA. The server apparatus 100 may be constituted by a single computer or a plurality of computers associated with each other.

The communication part 101 is a communication interface that connects the server apparatus 100 to the network. The communication part 101 includes a network interface board and a wireless communication circuit for wireless communication.

The memory part 102 includes the main memory and the auxiliary memory. The main memory is a memory in which a program to be executed by the control part 103 or data to be used by the control program is deployed. The auxiliary memory is a memory that stores a program to be executed by the control part 103 or data to be used by the control program.

The memory part 102 further stores service-related data 102A and vehicle data 102B.

The service-related data 102A is data concerning a service provided by the vehicle 200. FIG. 4 shows an example of the service-related data 102A. In this embodiment, the service-related data 102A is data that associates a service provided by a vehicle, the type of the body unit to be loaded to assemble the vehicle that provides the service, and the amount of power required to provide the service with each other. In the illustrated example, the service-related data 102A shows that when the vehicle 200 serves as a restaurant, the required power per hour is 2500 W, for example.

The vehicle data 102B is data concerning the chassis unit 210 and the body unit 220. The vehicle data contains a table in which information (chassis data) concerning the chassis unit is recorded as illustrated in FIG. 5A and a table in which information (body data) concerning the body unit is recorded as illustrated in FIG. 5B.

The chassis data contains the positional information on the relevant chassis unit 210, the operational state of the relevant chassis unit 210 (such as whether the chassis unit is on standby, is assembled and in operation, or is out of service), or information on the capacity of the loaded battery.

The body data contains an attribute of the relevant body unit 220 (a function provided), the positional information on the relevant body unit 220, the operational state of the relevant body unit 220 (such as whether the body unit is separated or is assembled and in operation), or the capacity of the loaded battery.

The chassis data may be periodically updated based on information transmitted from the chassis unit 210. The body data may also be periodically updated based on information transmitted from the body unit 220. However, if the body unit 220 has no network communication unit, the chassis unit 210 can transmit the body data on behalf of the body unit 220.

These pieces of data may be managed by a database management system (DBMS) executed by a processor. The database used in this embodiment may be a relational database, for example.

A way of using the data stored in the database will be described later.

The control part 103 is a computing device that is responsible for the control performed by the server apparatus 100. The control part 103 can be implemented by an arithmetic processing unit, such as a CPU.

The control part 103 has two functional modules, specifically, a power management part 1031 and an operation command part 1032. Each of the functional modules may also be implemented by the CPU executing a program stored in the auxiliary memory.

Figure 6B:
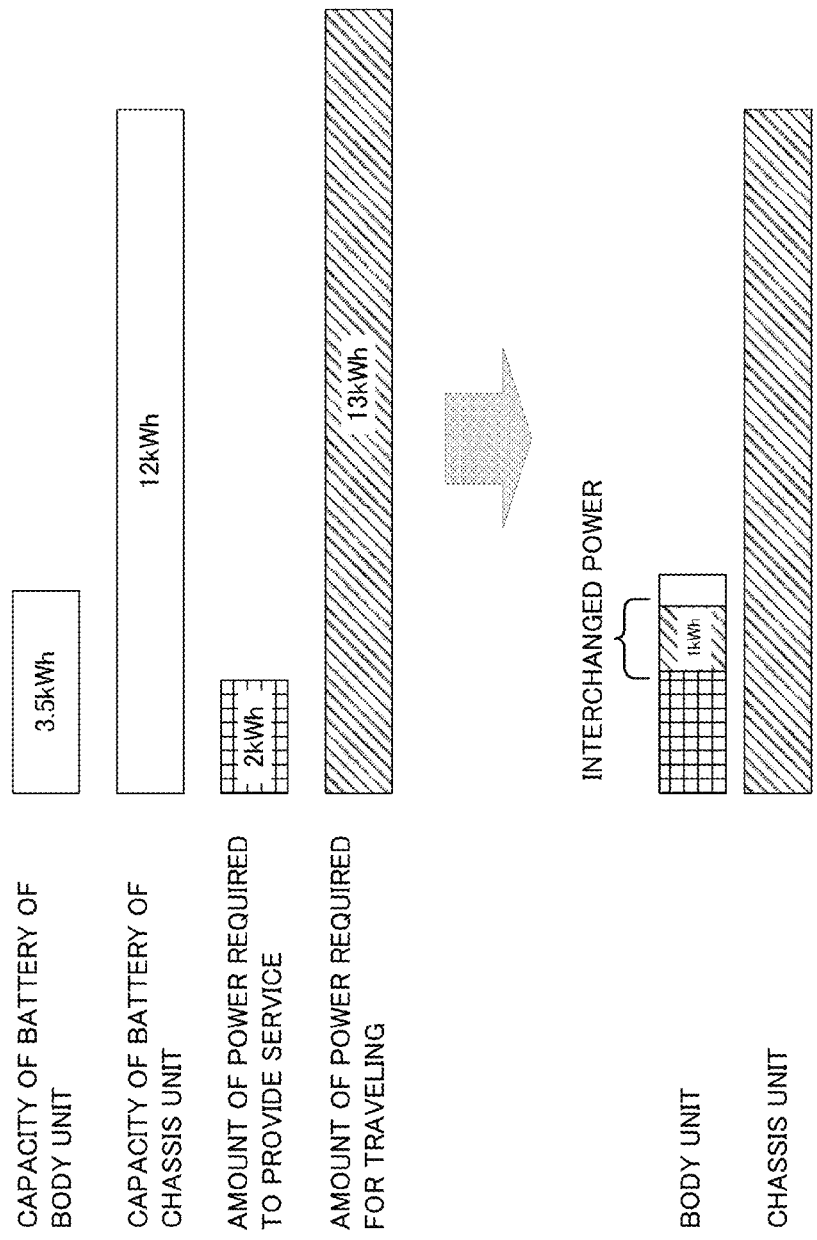
FIG. 6B is a diagram illustrating a power interchange between units.

The power management part 1031 develops a power plan for the vehicle 200. The power plan is a specific power supply scheme that allows the vehicle 200 to provide a service. Specifically, the power plan specifies the way in which the battery of the body unit and the battery of the chassis unit are used. FIGS. 6A and 6B are diagrams for illustrating power plans.

In the example illustrated in FIG. 6A, the body unit has a battery of 3 kWh, and the chassis unit has a battery of 12 kWh. In this case, if the amount of power required to provide a service is equal to or less than 3 kWh, and the amount of power required for traveling is equal to or less than 12 kWh, any particular problem does not arise. However, when the amount of power required to provide a service is estimated to be 4 kWh, the service would otherwise be unable to be provided. In such a case, the power management part 1031 determines whether the chassis unit can supply electricity to the body unit without any problem and determines to supply electricity from the chassis unit to the body unit if there is no problem.

More specifically, the power management part 1031 determines to perform a power interchange when "the chassis unit can make up the shortfall in power of the body unit while consuming an amount of power required for traveling". The amount of power required for traveling is the amount of power required for the chassis unit 210 to start an operation, travel along the predetermined route and complete the operation (or enter a rechargeable state). The upper limit of the amount of power supplied from the chassis unit to the body unit is the amount of charge of the battery minus the amount of power required for traveling.

In the illustrated example, the power management part 1031 determines the following.

The body unit consumes 3 kWh of power from the battery of the body unit.

The chassis unit consumes 10 kWh of power from the battery of the chassis unit.

The chassis unit supplies 1 kWh of power to the body unit.

In the example illustrated in FIG. 6B, the body unit has a battery of 3.5 kWh, and the chassis unit has a battery of 12 kWh. In this case, when the amount of power required for traveling is estimated to be 13 kWh, the service would otherwise be unable to be provided. In such a case, the power management part 1031 determines whether the body unit can supply electricity to the chassis unit without any problem and determines to supply electricity from the body unit to the chassis unit if there is no problem.

More specifically, the power management part 1031 determines to perform a power interchange when "the body unit can make up the shortfall in power of the chassis unit while consuming an amount of power required to provide a service". The amount of power required to provide a service is the amount of power required by the body unit 220 after the business is started until the business is ended (or the body unit enters a rechargeable state). The upper limit of the amount of power supplied from the body unit to the chassis unit is the amount of charge of the battery minus the amount of power required to provide the service.

In the illustrated example, the power management part 1031 determines the following.

The body unit consumes 2 kWh of power from the battery of the body unit.

The chassis unit consumes 12 kWh of power from the battery of the chassis unit.

The body unit supplies 1 kWh of power to the chassis unit.

If no power interchange is required, the body unit 220 uses power only to provide a service, and the chassis unit 210 uses power only for traveling. In other words, the body unit and the chassis unit independently use their respective power supplies. This mode is referred to as a first mode.

On the other hand, if a power interchange is required, the chassis unit 210 and the body unit 220 interchange power as required. This mode is referred to as a second mode.

The power management part 1031 determines in which mode to operate the vehicle 200 and develops a plan (power plan) that indicates a specific way in which power is interchanged.

When a plurality of body units 220 is loaded on the chassis unit 210, the power management part 1031 may sum the capacities of the batteries of the plurality of body units 220.

In response to receiving an operation request for a vehicle 200, which is an automatic driving car, the operation command part 1032 determines the vehicle 200 to be sent and generates an operation command responsive to the operation request. The operation command is data that specifies a route along which the vehicle 200 travels and a procedure or operation to be performed on the route. For example, the operation command indicates that the vehicle 200 travels to a predetermined site of business, sets up a shop and starts the business once arriving at the site, withdraws the shop after the business hours, and returns to a predetermined operation base.

Figure 7:
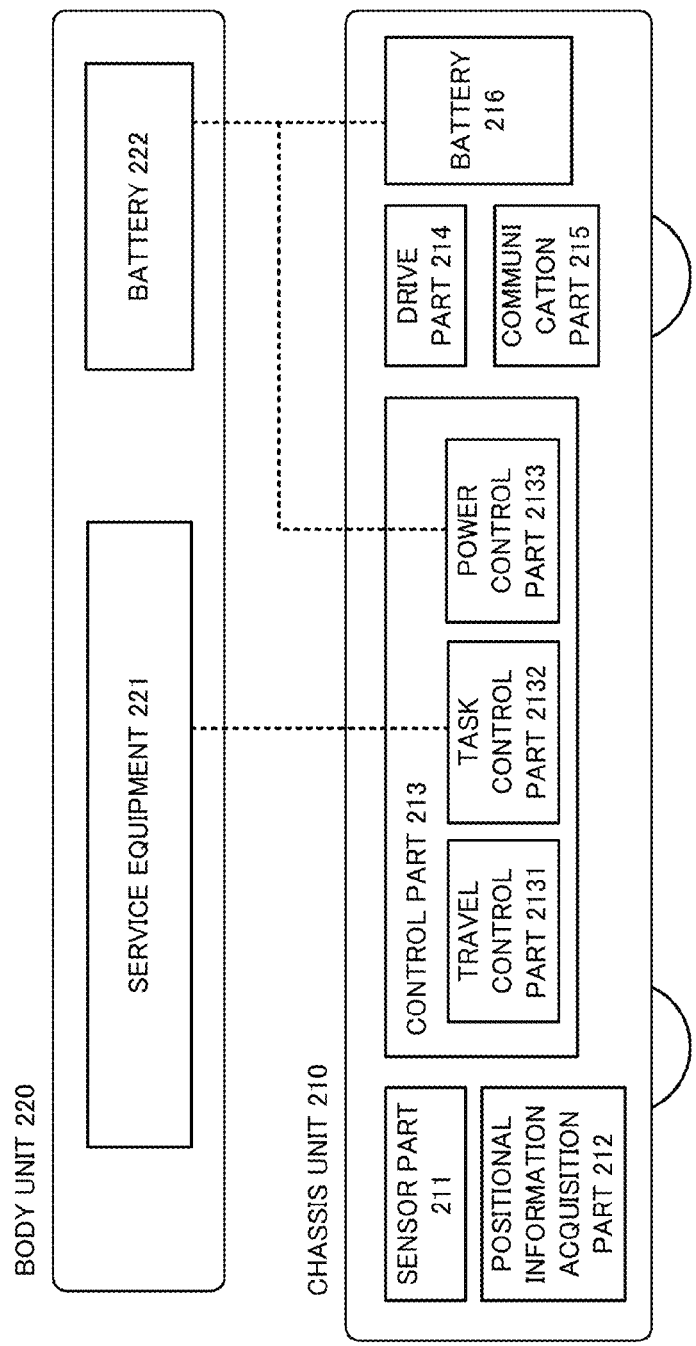
FIG. 7 is a diagram illustrating a system configuration of a body unit and a chassis unit.

Next, the chassis unit 210 and the body unit 220 forming the vehicle 200 will be described. FIG. 7 is a diagram illustrating an example of a hardware configuration of the chassis unit 210 and the body unit 220.

The chassis unit 210 is a vehicle platform that travels according to an operation command obtained from the server apparatus 100. More specifically, based on an operation command obtained by wireless communication, the chassis unit 210 travels on the road in an appropriate manner while sensing the surroundings of the vehicle. Furthermore, the chassis unit 210 may communicate with the body unit 220 to control the start and end of the service.

The chassis unit 210 includes a sensor part 211, a positional information acquisition part 212, a control part 213, a drive part 214, a communication part 215 and a battery 216. The chassis unit 210 operates on the electricity supplied from the battery.

The sensor part 211 is a unit that senses the surroundings of the vehicle and typically includes a stereo camera, a laser scanner, a LIDAR or a radar, for example. Information obtained by the sensor part 211 is transmitted to the control part 213. The sensor part 211 includes a sensor for enabling autonomous traveling.

The sensor part 211 may include a camera provided on the chassis unit 210. For example, the sensor part 211 may include a picture-taking device using an image sensor, such as a Charge Coupled Device (CCD) image sensor, a metal-oxide-semiconductor (MOS) image sensor or a complementary metal-oxide-semiconductor (CMOS) image sensor.

The positional information acquisition part 212 is a unit that acquires the current location of the chassis unit 210 and typically includes a GPS receiver. Information acquired by the positional information acquisition part 212 is transmitted to the control part 213.

The control part 213 is a computer that controls the chassis unit 210 based on the information obtained from the sensor part 211. The control part 213 is constituted by a microcomputer, for example.

The control part 213 has a travel control part 2131, a task control part 2132 and a power control part 2133 as functional modules. Each of the functional modules may be implemented by a central processing unit (CPU) executing a program stored in a memory unit, such as a read only memory (ROM).

The travel control part 2131 allows the vehicle to autonomously travel according to an operation command obtained from the server apparatus 100. The travel control part 2131 performs the following processings, for example.

(1) Generation of Travel Route

A travel route can be automatically generated based on a given point of departure and a given point of destination by referring to map data stored in advance. Alternatively, the travel route may be indicated by the server apparatus 100.

(2) Detection of Environment

The travel control part 2131 detects the environment surrounding the vehicle based on the data from the sensor part 211. What is detected may be the number and positions of the lanes, the number and positions of the vehicles around the vehicle, the number and positions of the obstacles (such as pedestrians, bicycles, structures or buildings) around the vehicle, the configuration of the road or the traffic signs, without limitation. Anything required to enable the autonomous traveling can be detected.

(3) Control of Autonomous Traveling

The travel control part 2131 controls the traveling of the vehicle based on the detected environment and the positional information on the vehicle obtained by the positional information acquisition part 212. For example, the travel control part 2131 makes the vehicle travel along a predetermined route in such a manner that any obstacle does not enter a predetermined safety zone centered at the vehicle. The method of making the vehicle autonomously travel can be a well-known method.

The task control part 2132 communicates with the body unit 220 to make the body unit 220 perform a predetermined task relating to the business or the provision of the service. Without limitation, the predetermined task may be "to make the body unit 220 set up a shop" or "to make the body unit 220 withdraw a shop", for example.

The power control part 2133 distributes power based on the power plan obtained from the server apparatus 100. A specific way of the power distribution will be described later.

The drive part 214 is a unit that makes the chassis unit 210 travel based on a command generated by the travel control part 2131. The drive part 214 includes a motor for driving a wheel, an inverter, a brake, a steering mechanism and a secondary battery, for example.

The communication part 215 is a communication unit that connects the chassis unit 210 to the network. In this embodiment, the communication part 215 can communicate with another apparatus (such as the server apparatus 100) over a network using a mobile communication service, such as 3G, LTE or 5G.

Note that the communication part 215 may further include a communication unit for inter-vehicle communication with other vehicles.

The battery 216 is a secondary battery for driving the chassis unit 210.

The body unit 220 can be loaded in the cabin or on the bed of the chassis unit 210. The chassis unit 210 can also be configured so that a plurality of body units 220 can be loaded. The chassis unit 210 can also be provided with a mechanism (including an elevator, an actuator and a guide rail) that lifts and lowers a predetermined unit of a plurality of body units 220.

The chassis unit 210 periodically notifies the server apparatus 100 of the status of the chassis unit 210 (such as the positional information, the identifier of the loaded body unit 220 or the like, which will be referred to as vehicle information hereinafter). The server apparatus 100 (power management part 1031) updates the chassis data based on the notified information. The vehicle information may include the information listed below, for example.

The type or identifier of the body unit(s) currently loaded.
The current state of charge (SOC).
The distance to empty.
Information concerning the operation route.
Information concerning an event that has occurred (such as the start and end of a service).

The body unit 220 has equipment for providing a service (service equipment 221) and a battery 222, which is a secondary battery, for supplying electricity to the service equipment.

The battery 216 and the battery 222 are configured so that the batteries can be electrically coupled to each other and can interchange power under the control of the power control part 2133. When the vehicle 200 is in the first mode, the batteries are electrically separated from each other. When the vehicle 200 is in the second mode, one of the batteries can supply electricity to the other battery within a determined value as the upper limit. For example, an operation is possible such as "the battery 216 supplies up to 1 kWh of power to the battery 222".

Figure 8:
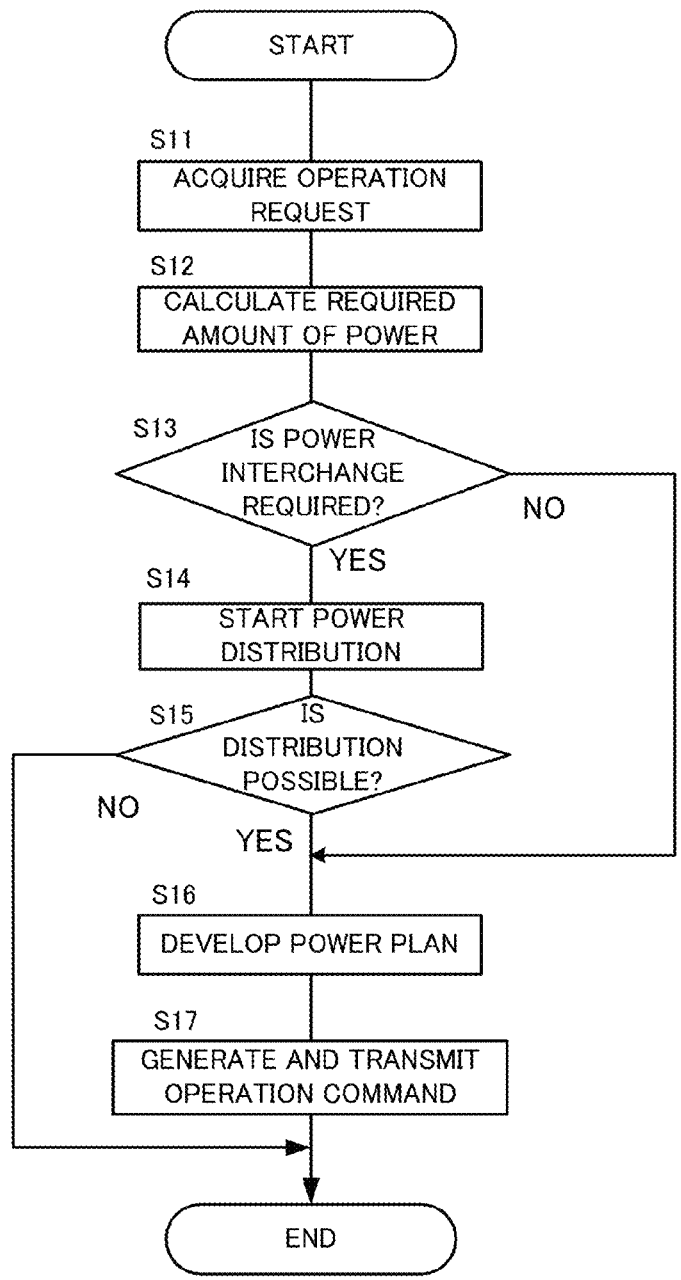
FIG. 8 is a flowchart illustrating a process performed by the server apparatus.

Next, a process performed by the server apparatus 100 according to this embodiment before indicating an operation of the vehicle 200 will be described with reference to FIG. 8.

First, in Step S11, the operation command part 1032 obtains an operation request. The operation request is generated by a service provider, for example, and transmitted to the server apparatus 100. The operation request contains the following information.

The type of the service provided by the vehicle 200.
The time for which the service is provided (such as the time to start the business and the time to end the business).
Information (such as positional information or travel route) that specifies the site where the service is provided (site of business).

In Step S12, the power management part 1031 then calculates the amount of power required to provide the service. Specifically, the power management part 1031 calculates (1) the amount of power used by the body unit to provide the service and (2) the amount of power used by the chassis unit to move the vehicle.

The (1) can be calculated based on the information contained in the operation request and the service-related data 102A. For example, if the amount of power per hour required for sales of commodities sales is 300 Wh and the business is open for three hours, the requires amount of power is 900 Wh.

The (2) can be calculated based on the information contained in the operation request and road map data stored in advance. For example, after the travel route of the vehicle 200 is determined, the travel distance is calculated, and the amount of power required for the traveling is calculated by considering an estimated condition. Note that if the travel route is specified in the operation request, the route can be used.

In Step S13, the power management part 1031 then determines whether a power interchange is required or not. For example, if the calculated amount of power (1) cannot be provided by the amount of charge of the battery of the body unit 220, or if the calculated amount of power (2) cannot be provided by the amount of charge of the battery of the chassis unit 210, the result of the determination in this step is affirmative.

If the result of the determination in this step is negative, the process proceeds to Step S16.

If the result of the determination in Step S13 is affirmative, in Step S14, the power management part 1031 starts the distribution of power in the manner described above. If it is determined that the distribution is possible, that is, the amount of power used for the service and the amount of power used for the traveling can be ensured even if the distribution is performed (if Yes in Step S15), the process proceeds to Step S16. If the distribution is impossible (if No in Step S15), that is, if a shortfall of power occurs even if the chassis unit and the body unit interchange power, the vehicle 200 cannot operate, and the power management part 1031 notifies the vehicle 200 of the fact and ends the process.

In Step S16, the power management part 1031 develops a power plan that indicates how to use the battery of the chassis unit and the battery of the body unit. The power plan includes information concerning (1) the specification of the power mode, and (2) what amount of power is supplied from which unit to which unit when the second mode is selected.

In Step S17, the operation command part 1032 then generates an operation command to the vehicle 200. The operation command includes the power plan developed in Step S16.

Figure 9:
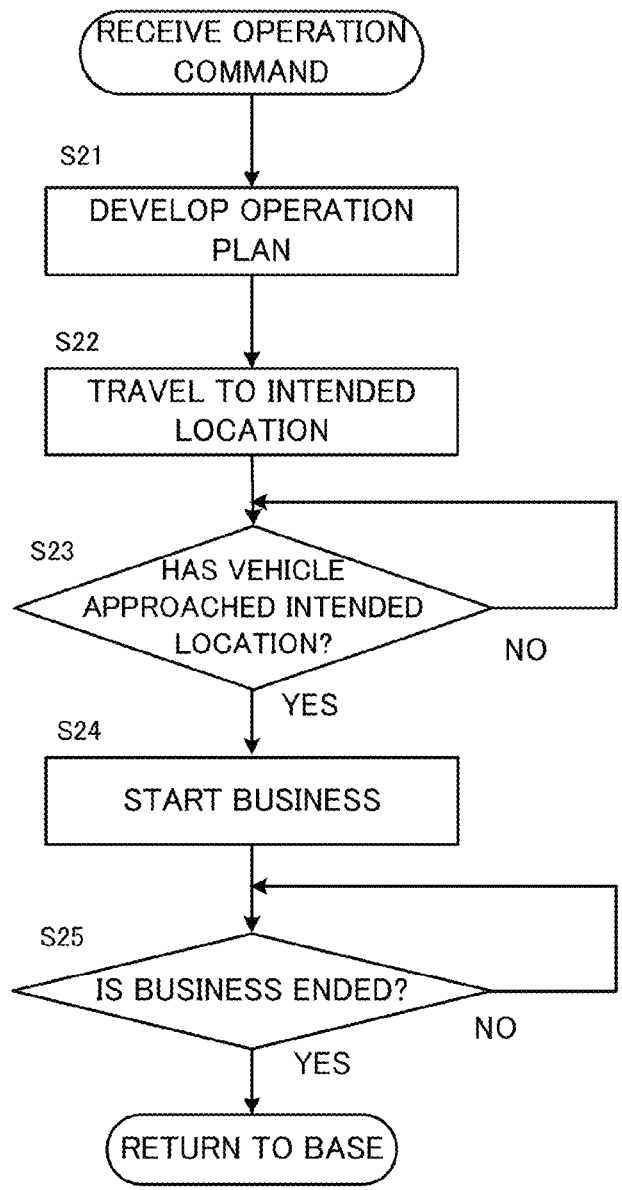
FIG. 9 is a flowchart illustrating a process performed by the chassis unit (travel control part).

FIG. 9 is a flowchart illustrating a process performed by the chassis unit 210 in response to receiving an operation command. Once the vehicle 200 starts operating, the chassis unit 210 and the body unit 220 supply power according to the power plan transmitted from the server apparatus 100.

In Step S21, the chassis unit 210 (travel control part 2131) starts automatic driving according to a received operation command. For example, the travel control part 2131 identifies a travel route and generates a task (movement task) to move to a site of business.

In Step S22, the travel control part 2131 makes the vehicle start traveling to the site of business based on the generated movement task. Note that, during operation, the vehicle information is periodically transmitted to the server apparatus 100.

As the vehicle approaches the site of business (Step S23), the travel control part 2131 searches for a place where the vehicle can be parked nearby the site of business and parks the vehicle at the place, and the task control part 2132 notifies the body unit 220 (service equipment 221) that the business can be started. Then, the body unit 220 starts the business (Step S24).

When a condition for ending the business is satisfied (Step S25), the task control part 2132 notifies the body unit 220 (service equipment 221) that the business should be ended. Then, the body unit 220 ends the business. After the business is ended, the travel control part 2131 performs a processing to make the vehicle 200 return to a predetermined operation base.

Figure 10:
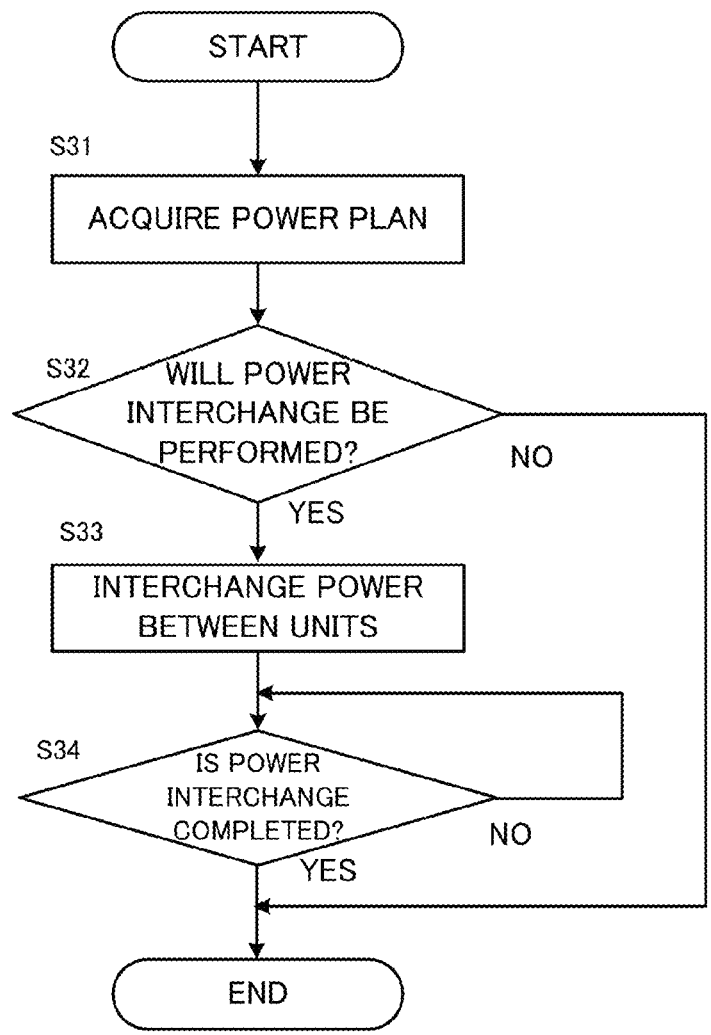
FIG. 10 is a flowchart illustrating a process performed by the chassis unit (power control part).

FIG. 10 is a flowchart illustrating a process performed by the power control part 2133 during traveling and business. The process is periodically performed during operation of the vehicle 200.

First, in Step S31, the power control part 2133 obtains the power plan transmitted from the server apparatus 100 and temporarily stored.

In Step S32, the power control part 2133 then determines whether to perform a power interchange or not. If the power plan specifies that a power interchange be performed, the result of the determination is affirmative.

In Step S33, the battery 216 and the battery 222 are electrically coupled to each other to interchange power. Whether the chassis unit supplies electricity to the body unit or the body unit supplies electricity to the chassis unit is appropriately determined based on the power plan.

In Step S34, the power control part 2133 determines whether to end the power interchange or not. For example, when the supply of the specified amount of power is finished, the result of the determination in this step is affirmative.

As described above, according to this embodiment, in a configuration in which the chassis unit and the body unit have their respective power supplies, the units interchange power as required. With such a configuration, the service provided by the vehicle can be expanded.

Second Embodiment

In the first embodiment, the server apparatus 100 develops the power plan in advance. However, depending on the operational state of the vehicle, an amount of power exceeding the amount of power predicted in advance may be used. In such a case, the chassis unit (power control part 2133) can modify the power plan. For example, the chassis unit (power control part 2133) can obtain the latest status of power consumption and estimate that the power consumption will exceed the expected amount and the remaining power of the battery of any of the chassis unit 210 and the body unit 220 will be exhausted. In such a case, whether a power interchange is possible or not can be determined, and if possible, an unplanned power interchange can be performed. That is, the mode can be switched from the mode determined by the server apparatus to the other mode based on the determination on the vehicle side. Furthermore, the amount of power to be interchanged determined in advance can also be changed. The determination to switch the mode can be made at Step S32. In that case, the upper limit of the amount of power to be interchanged is the excess amount of power.

The excess amount of power can be recalculated by the server apparatus 100 in response to a request from the vehicle 200. If the vehicle has data on which the calculation is based, the calculation can be performed on the vehicle side.

When any of the provision of the service and the traveling of the vehicle is impossible even if the unplanned power interchange is performed, the operation or business can be determined to be ceased.

Third Embodiment

In the first embodiment, the server apparatus 100 develops the power plan. However, the power plan can also be developed by the vehicle 200. In that case, the power control part 2133 can calculate the amount of power required to provide the service and the amount of power required for traveling and then determine whether a power distribution or interchange between the units is required or not. That is, the vehicle (chassis unit 210) can determine which of the first and second modes is to be adopted. The data required to calculate the amount of power (such as the service-related information) may be obtained from the server apparatus 100 as required or may be stored on the vehicle side in advance.

OTHER MODIFICATIONS

The embodiments described above are just examples, and various modifications are possible without departing from the spirit of the present disclosure.

For example, the processings and units described in the present disclosure can be used in any combination as far as no technical contradiction occurs.

In the description of the embodiments, an example has been described in which the vehicle 200 moves to a predetermined site of business and then sets up a shop. However, if the movement itself is included in the service, the vehicle 200 may provide the service while traveling. In that case, the "amount of power required to provide the service" is the amount of the power consumed in the body unit.

Although the vehicle 200 has been illustrated in the description of the embodiments, any conveyance other than the vehicle can be contemplated. For example, by loading a body unit having a particular capability on an aircraft platform or a ship platform, an aircraft or ship used for a predetermined application can be assembled.

Furthermore, a processing described as being performed by one device may be performed in cooperation of a plurality of devices. Alternatively, processings described as being performed by different devices may be performed by one device. In the computer system, the hardware component (server component) that provides each function can be flexibly changed.

The present disclosure can also be implemented by installing a computer program that implements the functions described above with regard to the embodiments in a computer and by one or more processors of the computer reading and executing the program. Such a computer program may be provided to the computer via a non-temporary computer readable memory medium that can be connected to a system bus of the computer, or may be provided to the computer via a network. The non-temporary computer readable memory medium may be any type of disk such as a magnetic disk (such as a floppy (registered trademark) disk or a hard disk drive (HDD)) or an optical disk (such as a CD-ROM, a DVD disk or a Blu-ray disk), or any type of medium suitable for storage of an electronic instruction, such as a read only memory (ROM), a random access memory (RAM), an EPROM, an EEPROM, a magnetic card, a flash memory or an optical card.

What is claimed is:

1. An information processing apparatus that controls a vehicle having a body unit, a chassis unit, a service power supply used to provide a service and a driving power supply used for traveling, comprising:
    a storage unit configured to store service-related information concerning the service provided by the vehicle; and
    a controller configured to:
    select any of a first mode, in which the service power supply and the driving power supply are independently used, and a second mode, in which the service power supply and the driving power supply are shared, based on the service-related information;
    receive a request to perform the service by the vehicle;
    determine an amount of power required to be used by the body unit to provide the service;
    determine an amount of power to be used by the chassis unit to move the vehicle along a travel route associated with the service;
    determine an amount of power available to be provided by the service power supply;
    determine an amount of power available to be provided by the driving power supply;
    determine whether the amount of power available to be provided by the service power supply is greater than or equal to the amount of power required to be used by the body unit to provide the service;
    determine whether the amount of power available to be provided by the driving power supply is greater than or equal to the amount of power required to be used by the chassis unit to move the vehicle along the travel route associated with the service;
    upon determination that the amount of power available to be provided by the service power supply is not greater than or equal to the amount of power required to be used by the body unit to provide the service or that the amount of power available to be provided by the driving power supply is not greater than or equal to the amount of power required to be used by the chassis unit to move the vehicle along the travel route associated with the service:
    determine whether the service power supply can make up the shortfall in power required by the chassis unit or whether the driving power supply can make up the shortfall in power required by the body unit;
    upon determination that the service power supply can make up the shortfall in power required by the chassis unit or the driving power supply can make up the shortfall in power required by the body unit, share power between the service power supply and the chassis unit or between the driving power supply and the body unit; and
    upon determination that the service power supply cannot make up the shortfall in power required by the chassis unit or that the driving power supply cannot make up the shortfall in power required by the body unit, notify the vehicle.

2. The information processing apparatus according to claim 1, wherein
    the service-related information is data that associates the service provided by the vehicle with an amount of power required to provide the service.

3. The information processing apparatus according to claim 1, wherein the controller selects the second mode when an amount of power provided by the service power supply alone is insufficient to provide the service.

4. The information processing apparatus according to claim 1, wherein the controller selects the second mode when an amount of power provided by the driving power supply alone is insufficient for the vehicle to travel along a predetermined travel route.

5. The information processing apparatus according to claim 4, wherein the storage unit further stores route information indicating the predetermined travel route, and the controller determines whether the amount of power provided by the driving power supply is sufficient or not based on the route information.

6. The information processing apparatus according to claim 1, wherein in the second mode, the controller calculates an amount of power required for traveling and determines to use the driving power supply to provide the service within an upper limit of an excess amount of power of the driving power supply.

7. The information processing apparatus according to claim 1, wherein in the second mode, the controller calculates an amount of power required to provide the service based on the service-related information, and determines to use the service power supply to drive the vehicle within an upper limit of an excess amount of power of the service power supply.

8. The information processing apparatus according to claim 1, wherein the vehicle is configured so that two or more body units having different functions are loaded onto the vehicle, and each of the body units is connected to the service power supply.

9. The information processing apparatus according to claim 8, wherein the controller sums capacities of service power supplies of a plurality of units loaded.

10. An information processing method performed by an information processing apparatus associated with a vehicle having a body unit, a chassis unit, a service power supply used to provide a service and a driving power supply used for traveling, the method comprising:

acquiring service-related information concerning the service provided by the vehicle;

selecting any of a first mode, in which the service power supply and the driving power supply are independently used, and a second mode, in which the service power supply and the driving power supply are shared, based on the service-related information;

receiving a request to perform the service by the vehicle;

determining an amount of power required to be used by the body unit to provide the service;

determining an amount of power to be used by the chassis unit to move the vehicle along a travel route associated with the service;

determining an amount of power available to be provided by the service power supply;

determining an amount of power available to be provided by the driving power supply;

determining whether the amount of power available to be provided by the service power supply is greater than or equal to the amount of power required to be used by the body unit to provide the service;

determining whether the amount of power available to be provided by the driving power supply is greater than or equal to the amount of power required to be used by the chassis unit to move the vehicle along the travel route associated with the service;

upon determination that the amount of power available to be provided by the service power supply is not greater than or equal to the amount of power required to be used by the body unit to provide the service or that the amount of power available to be provided by the driving power supply is not greater than or equal to the amount of power required to be used by the chassis unit to move the vehicle along the travel route associated with the service:

determining whether the service power supply can make up the shortfall in power required by the chassis unit or whether the driving power supply can make up the shortfall in power required by the body unit;

upon determination that the service power supply can make up the shortfall in power required by the chassis unit or the driving power supply can make up the shortfall in power required by the body unit, share power between the service power supply and the chassis unit or between the driving power supply and the body unit; and upon determination that the service power supply cannot make up the shortfall in power required by the chassis unit or that the driving power supply cannot make up the shortfall in power required by the body unit, notify the vehicle.

11. The information processing method according to claim 10, wherein the service-related information is data that associates the service provided by the vehicle with an amount of power required to provide the service.

12. The information processing method according to claim 10, wherein the second mode is selected when an amount of power provided by the service power supply alone is insufficient to provide the service.

13. The information processing method according to claim 10, wherein the second mode is selected when an amount of power provided by the driving power supply alone is insufficient for the vehicle to travel along a predetermined travel route.

14. The information processing method according to claim 13, wherein route information indicating the predetermined travel route is further acquired, and whether the amount of power provided by the driving power supply is sufficient or not is determined based on the route information.

15. The information processing method according to claim 10, wherein in the second mode, an amount of power required for traveling is calculated, and it is determined to use the driving power supply to provide the service within an upper limit of an excess amount of power of the driving power supply.

16. The information processing method according to claim 10, wherein in the second mode, an amount of power required to provide the service is calculated based on the service-related information, and it is determined to use the service power supply to drive the vehicle within an upper limit of an excess amount of power of the service power supply.

17. A non-transitory computer readable storing medium recording a computer program for causing a computer to perform an information processing method according to claim 10.

18. A vehicle system, comprising:
a first information processing apparatus that controls a vehicle having a body unit, a chassis unit, a service power supply used to provide a service and a driving power supply used for traveling; and
a second information processing apparatus that provides service-related information concerning the service provided by the vehicle,
wherein the first information processing apparatus comprises a controller configured to:
select any of a first mode, in which the service power supply and the driving power supply are independently used, and a second mode, in which the service power supply and the driving power supply are shared, based on the service-related information;
receive a request to perform the service by the vehicle;
determine an amount of power required to be used by the body unit to provide the service;
determine an amount of power to be used by the chassis unit to move the vehicle along a travel route associated with the service;
determine an amount of power available to be provided by the service power supply;
determine an amount of power available to be provided by the driving power supply;
determine whether the amount of power available to be provided by the service power supply is greater than or equal to the amount of power required to be used by the body unit to provide the service;
determine whether the amount of power available to be provided by the driving power supply is greater than or equal to the amount of power required to be used by the chassis unit to move the vehicle along the travel route associated with the service;
upon determination that the amount of power available to be provided by the service power supply is not greater than or equal to the amount of power required to be used by the body unit to provide the service or that the amount of power available to be provided by the driving power supply is not greater than or equal to the amount of power required to be used by the chassis unit to move the vehicle along the travel route associated with the service:
determine whether the service power supply can make up the shortfall in power required by the chassis unit or whether the driving power supply can make up the shortfall in power required by the body unit;
upon determination that the service power supply can make up the shortfall in power required by the chassis unit or the driving power supply can make up the shortfall in power required by the body unit, share power between the service power supply and the chassis unit or between the driving power supply and the body unit; and
upon determination that the service power supply cannot make up the shortfall in power required by the chassis unit or that the driving power supply cannot make up the shortfall in power required by the body unit, notify the vehicle.

19. The vehicle system according to claim 18, wherein the service-related information is data that associates the service provided by the vehicle with an amount of power required to provide the service.

20. The vehicle system according to claim 18, wherein the first information processing apparatus selects the second mode when an amount of power provided by the service power supply alone is insufficient to provide the service or when an amount of power provided by the driving power supply alone is insufficient for the vehicle to travel along a predetermined travel route.

* * * * *